ary, 1970

United States Patent Office 3,549,580
Patented Dec. 22, 1970

3,549,580
PROCESS FOR THE MANUFACTURE OF SPIN-
NABLE SOLUTIONS OF β-POLYAMIDES
Erwin Schmidt, Ernst Höroldt, Kelkheim, Taunus, and Walter Rupp, Niederhofheim, Taunus, Germany, assignors to Farbwerke Hoechst Aktiengesellschaft vormals Meister Lucius & Brüning, Frankfurt am Main, Germany, a corporation of Germany
No Drawing. Filed Nov. 14, 1968, Ser. No. 775,897
Claims priority, application Germany, Nov. 21, 1967, 1,720,751
Int. Cl. C08g 20/10, 51/44
U.S. Cl. 260—30.2          6 Claims

ABSTRACT OF THE DISCLOSURE

Process for the manufacture of spinnable solutions of poly-β-amides by dissolving β-lactams which are unsubstituted at the nitrogen atom in at least one specific neutral or at most weakly basic solvent containing 0.9% to 50% by weight of at least one lithium halide or lithium pseudo halide, and carrying out the polymerization in the presence of catalysts and, optionally, activators usually employed in the anionic polymerization of β-lactams.

---

The present invention relates to a process for the manufacture of spinnable solutions of β-polyamides.

It has already been proposed to polymerize β-lactams in highly polar solvents in which case the polyamide is obtained in the form of a swollen gel (Angew. Chem. internat. edit., vol. 1, p. 484). In this form the polymers can be worked up with difficulty only. When working on an industrial scale, it is, therefore, necessary to carry out the polymerization in a two-phase system and to tolerate working up and dissolving processes prior to the further processing. Working-up from the melt is but rarely possible owing to the high melting points of the polyamides.

It has, furthermore, been proposed that aromatic polyamides from solutions of metal salts, especially lithium chloride, may be dissolved in anhydrous, acid-free organic solvents and that they may be worked up from these solutions (German Auslegeschrift 1,107,399); however, ih has not been possible up to the present time to polymerize lactams, especially β-lactams, in solvent systems of this type and to spin the polyamide solutions obtained in this form or to work them up into shaped articles ("direct polymerization").

Direct polymerization of β-lactams to give shapeable solutions has heretofore only been possible in phosphoric acid trisdimethylamide and benzene (German Pat. 1,099,-727, Example 5 and German Pat. 1,141,452, Example 8). It is restricted in the first case to β-lactams carrying in β-position to the carbonyl group two substitutents of which at least one is a methyl group.

The applicability of a direct polymerization in benzene is still more strictly limited to substantially amorphous β-lactam polymers such, for example, as the polymer of 4-methyl-4-n-propyl-azetidinone. By this method there are only obtained polymer solutions of low viscosity. The great majority of the β-lactam polymers is crystalline and insoluble in benzene. β-lactam polymers which carry one or two hydrogen atoms in β-position to the carbonyl group are insoluble also in phosphoric acid trisdimethyl amide.

Now we have found that spinnable solutions of poly-β-amides can be obtained by direct polymerization when β-lactams which are unsubstituted at the nitrogen atom are polymerized in a neutral or at most weakly basic solvent in the presence of catalysts and, optionally, activators usually employed in the anionic polymerization of β-lactams, said solvent containing 0.9% to 50% by weight of lithium halides or lithium pseudo halides, and the molecules of which contain 1 to 12 carbon atoms, at least two hetero atoms of Group V or Group VI of the Periodic Table in direct linkage with one another or linked through a carbon atom, and which contain a semipolar or a double bond at at least one of these hetero atoms.

The polymer solutions obtained in this manner are stable and withstand storage even at room temperature for many weeks. The solvent system is substantially less selective than phosphoric acid trisdimethyl amide and benzene. It is, therefore, possible to polymerize according to the process of the present invention with special advantage also β-lactams carrying one or two hydrogen atoms in β-position to the carbonyl group.

Moreover, due to the great number of solvents and lithium salts that may be used there exist many possibilities of combination and variation which may be adapted to the purpose required in each case. Systems as, for example, dimethyl formamide/lithium chloride are, also for economic reasons, to be preferred to phosphoric acid trisdimethylamide.

The polymer solutions obtained by the process according to the invention are highly viscous and may be used with special advantage for the manufacture of filaments and films.

Also the solutions of the monomeric β-lactams in the solvent systems of the invention are stable for an unlimited period. They polymerize only upon the addition of catalysts usually employed for the anionic polymerization of lactams. The polymerization proceeds more rapidly while yielding higher degrees of polymerization than when it is carried out in the same solvents without the addition of lithium salts.

This behavior could not be expected for, on the one hand, lithium salts act as strong bases in aprotonic solvents. For example, they catalyze the anionic polymerization of acrylonitrile (Advances in Organic Chemistry, vol. 5, p. 32, New York, 1965). Monomer solutions of this type, therefore, do not withstand storage.

On the other hand it could not be expected that the stable solutions of β-lactams in dimethyl formamide containing lithium salts would polymerize smoothly upon the addition of compounds of alkali metals or alkaline earth metals which are strong bases not only in aprotonic solvents but also in aqueous solution. Since in the anionic polymerization of β-lactam the lactam anion plays a decisive role (Angew. Chem. internat. Edit., vol. 1, 485), it could also have been expected that the concentration of lithium salt which is by a multiple higher would have restrained the dissociation of the alkali metal lactamate and, thereby, impeded or prevented the polymerization. Instead of this phenomenon, there was observed an acceleration of the polymerization which renders it possible to carry out the polymerization and spinning of the solution, for example, in a closed installation of very small dimensions which operates continuously.

Practically all β-lactams, inasmuch as they are unsubstituted at the nitrogen atom, i.e. only carry one hydrogen atom at the nitrogen atom, may be polymerized by the process of the invention such, for example, as unsubstituted azetidinone, 4-methyl-azetidinone, 4-ethyl-azetidinone, 4 - n-butyl-azetidinone, 4-n-dodecyl-azetidinone, 4-vinyl-azetidinone, 4-phenyl-azetidinone, 3,3-dimethylazetidinone, cis- and trans-3,4 - dimethyl-azetidinone, 4,4-dimethyl - azetidinone, 4 - methyl-4-n-propylazetidinone, 4-methyl - 4 - neopentyl-azetidinone, 4-methyl-4-phenoxymethyl-azetidinone, 4,4 - diethyl-azetidinone, 4,4 - pentamethylene-azetidinone, 3,4 - tetramethylene-azetidinone, 3,4-(1,3-cyclopentylene)-azetidinone, 3,4,4-trimethyl-azetidinone, 3,3,4,4-tetramethyl-azetidinone. Those β-lactams unsubstituted at the nitrogen atoms, which carry one or two hydrogen atoms in β-position to the carbonyl group, may be employed with special advantage according to the process of the invention.

The optical antipodes of β-lactams having centres of asymmetry in the molecule may be polymerized singly or in any desired mixture. Copolymers of β-lactams with one another or with α-pyrrolidone may also be obtained by the process of the invention.

In order to obtain directly spinnable β-polyamide solutions according to the process of the invention there are used as catalysts for the polymerization of the β-lactams which are unsubstituted at the nitrogen atom those catalysts which are generally employed in the anionic polymerization of β-lactams, i.e., mainly alkali metal lactamates. Generally speaking such alkali metal or alkaline earth metal compounds have a catalytic action whose aqueous solutions have an alkaline reaction with respect to phenolphthalein. The catalysts may be added to the solution of the monomers in the usual manner or they may be produced in the polymerization batch by the addition of alkali metals, alkaline bases or salts of weak acids.

Corresponding alkaline earth metal compounds have a similar action. From the great number of catalysts that may be used, the following catalysts are mentioned by way of example: sodium compound of 4,4 - dimethyl-azetidinone, pyrrolidone-potassium sodium acetylide, sodium, sodium hydroxide, lithium hydroxide, sodium cyanide, calcium cyanide, potassium cyanide, phenyl lithium, ethyl magnesium bromide, 4-methyl-azetidinone-lithium.

The concentration of the catalyst may vary considerably and depends on the reactivity and concentration of the monomer, the activator concentration and the possibility of abstracting the heat evolved during the polymerization. The catalyst is generally added at the rate of 0.1% to 10% by weight, preferably 0.1% to 3% by weight, calculated on the amount of the monomers used.

As is known, N-acyl-lactams act as chain starting agents or activators in the anionic polymerization of β-lactams. Said N-acyl-lactams are also used in the manufacture of the spinnable solutions of β-polyamides according to the process of the present invention. They are added to the polymerization batch in the usual manner or are produced in the batch itself by acylating agents. As activators there may be used, for example, N-benzoyl-4,4-dimethyl - azetidinone, phenyl isocyanate, benzene sulfochloride, oxalybis-pyrrolidone, N,N'-bis-(carbo-methoxy)-ethylene urea. The concentration of the activator largely determines the polymerization degree of the final product; it is, therefore, varied within a broad range according to the required purpose. It is also possible to operate without an activator. The activator is generally used in an amount within the range of from 0 to 1% by weight, calculated on the amount of the monomers used.

Since the properties of the polymer solution formed are essentially determined by the concentration and the polymerization degree of the polymer, it is necessary to impart the desired properties to the polymer solution by choosing a suitable proportion of these two values. These values depend on the purpose required in each case. The concentration of the polymer may, therefore, vary within a broad range. It is generally advantageous to operate with monomer concentrations within the range of from 1% to 80% by weight, calculated on the total weight of the solution.

When operating with lower monomer concentrations, the polymerization is generally adversely affected by contaminations of the solvent. In the case of too high concentrations, the polymer solution becomes too viscous and tends to gelatinize. However, when choosing suitable conditions, the polymerization and work-up many also be carried out outside this range of concentration. It is also possible and, under certain circumstances, advantageous to alter the ratios of concentration during or after the polymerization by the addition of monomers, solvents and lithium salt. Especially when supplying the monomer in measured amounts during the polymerization, it is possible to influence the molecular weight, the distribution of the molecular weight and the character of the copolymers. The degree of polymerization, the reaction period and the properties of the polymer solution formed are also influenced by the polymerization temperature.

When operating at an elevated temperature it is possible in many cases to use lesser concentrations of lithium salt. It is sometimes advantageous to vary the temperature of the batch during the polymerization procedure and the work-up. For example, to attain a high polymerization degree, the polymerization may be carried out at 10° C. and spinning at 100° C. In a closed apparatus which operates continuously it is sometimes advantageous to operate at a temperature which increases from the stage of metering in the monomers until the polymer solution reaches the spinneret. The temperatures of the polymerization and of the work-up may be situated within the range of from below 0° C. up to and including the boiling point of the solution; however, it is also possible to operate under pressure at a temperature which is superior to this range. It is generally advantageous to carry out the polymerization within a temperature range of from 0° C. to approximately 80° C. In the polymerization process according to the invention there are used as solvents neutral or at most weakly basic solvents the molecules of which contain 1 to 12 carbon atoms, at least two hetero atoms of Group V or Group VI, preferably of the 2nd and 3rd Period (N, P, O, S) of the Periodic Table in direct linkage with one another or linked through a carbon atom, and which contain a semi-polar or a double bond at at least one of these hetero atoms. From this group of solvents, those solvents may be used with special advantage whose hetero atoms do not contain hydrogen atoms in direct linkage, for example dimethyl sulfoxide or tetramethylene sulfon. For the manufacture of films and filaments it is in most cases advantageous when the solvent used in miscible with water. Which combination of solvent and lithium salt can be used with optimum advantage in each case depends on the properties of the monomers and the polymers made thereof and on the required purpose. Organic acid amides and esters have the broadest range of application. There are preferably used the amides of formic acid, acetic acid and carbonic acid, in whose lithium salt solution the β-polyamides have the optimum solubility; there are mentioned, for example: Formamide, acetamide, ε-caprolactam. Since amides, which carry hydrogen atoms at the nitrogen atom frequency act as chain terminating agents, there are attained high polymerization degrees in the said amides only with β-lactams which have a sufficiently high rate of polymerization. For this reason it is generally advantageous to use such amides whose nitrogen atoms are fully substituted. For this reason, and also for reasons of economy, dimethyl formamide, dimethyl acetamide and methyl pyrrolidone are especially preferred.

Other suitable solvents are tetramethyl urea, malonic acid-bis-(diethylamide), the semi-ester amides of carbonic acid such as N,N-dimethyl-urethane, imino ethers, amidines, guanidines, thiocarbonic acid amides and thio ureas. Also lithium salt solutions in esters may be used as solvents for the polymerization of β-lactams unsubstituted at the nitrogen atom for the manufacture of spinnable solutions according to the process of the invention. Cyclic esters with 5 or 6 ring members are especially advantageous since they have a minor action as chain starting agents (activators) and, in this manner, likewise enable high polymerization degrees to be attained. To this group of esters there belong, for example, glycol carbonate, glycol oxalate or γ-butyrolactone.

The polymers formed are maintained in solution by the addition of lithium halides or lithium pseudo halides. The lithium salts may be added prior to and during the polymerization so that the polymer is maintained in solution. The lithium halides and lithium pseudo halides to be used are lithium fluoride, -chloride, -bromide, -iodide, -cyanide, -thiocyanate, -azide and -cyanate, which must likewise be regarded as belonging to the group of the pseudo halides. Which of these salts can be used with special advantage must be examined in each individual case. As a rule, the cheaper lithium chloride will be preferred. Also the optimum concentration of the lithium salts has to be varied from case to case. Generally the stability of the polymer solutions decreases with a decreasing content of lithium salt. For the work-up it may be advantageous to obtain solutions of an unlimited stability or solutions which are in a state bordering on gel formation. Generally polymer solutions having satisfactory properties are obtained with lithium salt concentrations of from 1% by weight to that concentration at which the solution is saturated with said salt, which amounts in some systems to more than 50% by weight, calculated on the amount of the lithium salt solution used as the solvent. In most cases, solutions of an unlimited stability are obtained with lithium salt concentrations of from 5 to 20% by weight, calculated on the solvent. It is also possible to add to the monomer solution other polymers which are soluble therein. In this manner it is possible, for example, to spin polymer mixtures of β-lactam polymers with polycaprolactam or polyacrylonitrile.

The polymer solutions obtained by the process of the present invention may be worked up in various ways directly into films, fibers, filaments and shaped articles. The work-up into films, fibers or filaments may be carried out by the dry- or the wet spinning process. In the dry spinning process it is necessary to wash out the lithium salt from the filament after the spinning process with water, alcohols or other solvents which dissolve the lithium salts.

As mentioned above, it is also possible to spin the polymer solutions in the wet state. As precipitating bath liquids there may be used a variety of different solvents such as water, methanol, glycerine, acetone, dioxane, chloroform and the like, in which the polymer coagulates. With the use of the aforesaid solvents, two different precipitating processes result. In water, methanol or dimethyl formamide, for example, polymer filaments or films which are free from lithium salt are obtained, which filaments or films may subsequently be freed from the precipitating agent by drying or washing out with water. With the use, for example, of acetone or tertiary butanol, however, the lithium chloride complex of the polymer precipitates, from which the lithium salt may then, for example, be washed out with water. With both processes filaments and films having different properties are obtained.

The films, fibers and filaments may be drawn and fixed in the wet or in the dry state in known manner.

The following examples serve to illustrate the invention, but they are not intended to limit it thereto:

EXAMPLE 1

To a solution consisting of 50 grams of 4-methylazetidinone, 225 ml. of dimethyl formamide, 25 grams of lithium chloride and 60 mg. of oxalyl pyrrolidone there was added a solution consisting of 0.5 gram of pyrrolidone-potassium and 0.5 ml. of 4,4-dimethyl-azetidinone as solubilizing agent in 5 ml. dimethyl formamide. The temperature rose during the course of 3 minutes from 15° to 70° C. and then declined rapidly. A highly viscous, clear solution was obtained the viscosity of which did not alter over a period of 15 days. The yield of polymeric product corresponded to 100% of the theoretical yield.

(a) With a part of the polymer solution 0.2 mm. thick films were spread on glas plates which were placed in dimethyl formamide. After one hour a transparent sheet had come off the glass plate. After being washed out with water, the moist sheet was drawn on a flat iron at 150° to 200° C. in a ratio of 1:4.

(b) Another part of the polymer solution was heated to 80° C., filtered and spun through a spinneret of gold and platinum having 60 openings (diameter of the opening: 80 microns) into a precipitating bath composed of equal parts of dimethyl formamide and water which was maintained at the temperature of 40° C. The filament was drawn off from the precipitating bath at a rate of 6.4 meters/minute and then drawn in water at 72° C. to 3.4 times its length. After a re-washing operation, a transparent filament having a good ultimate tensile strength was obtained.

(c) Still another part of the polymer solution was stirred with water in a mixer, and a polymer in the form of a loose mass containing fiberlike particles was obtained. It had a relative viscosity of 6.6, measured on 1 gram of the substance in 100 ml. of concentrated sulfuric acid at 20° C.

Control experiment.—When the polymerization was carried out under the same conditions as described in paragraph 1 of Example 1, however, in the absence of lithium salts and with the use of the same volume of phosphoric acid trismethylamide or benzene instead of dimethyl formamide, the batch solidified during the course of 35 to 60 minutes to form a gel that could be cut into cubes and did not liquefy even when being heated to 150° or 80° C.

EXAMPLE 2

0.4 gram of pyrrolidone-potassium was added to a solution of 20 grams of 4,4-dimethyl-azetidinone, 90 ml. of dimethyl formamide, 5 grams of lithium chloride and 20 mg. of oxalyl pyrrolidone.

The temperature rose during the course of 15 minutes to 40° C. and then declined. The high-viscous spinning solution obtained could be spread on glass plates to yield films which coagulated upon being placed in water, glycerine or dimethyl formamide. They could be drawn with or without heating. By stirring the polymer solution with water in the mixer, the polymer was obtained in the form of a loose mass. The relative viscosity was 6.5, measured on 1 gram of the substance in 100 ml. of concentrated sulfuric acid at 20° C. The yield amounted to 98% of the theoretical yield.

EXAMPLE 3

0.2 gram pyrrolidone-potassium was added to a solution consisting of 10 grams of 4-methyl-azetidinone, 10 grams of 4,4-dimethyl-azetidinone, 10 grams of lithium chloride and 20 mg. of oxalyl pyrrolidone in 90 ml. of dimethyl formamide at 20° C. During the course of 10 minutes the temperature rose to 60° C. and then declined rapidly. The high-viscous stable spinning solution obtained could be worked up into sheets and filaments in a manner analogous to that described in the foregoing examples. The relative viscosity of the copolymer was 5.1, measured on 1 gram of the substance in 100 ml. of concentrated sulfuric acid. The yield amounted to 98% of the theoretical yield.

EXAMPLE 4

During the course of 30 minutes, a solution of 0.02 gram of oxalyl pyrrolidone in 20 grams of 4-methyl-azetidinone was allowed to run into a solution consisting of 0.1 gram pyrrolidone-potassium and 10 grams of lithium-chloride in 80 ml. of dimethyl formamide at 20° C. A highly viscous spinning solution was obtained which could be worked up into filaments and sheets. The polymer had a relative viscosity of 9.9 (measured on 1 gram of the substance in 100 ml. of concentrated sulfuric acid at 20° C.). The yield amounted to 100% of the theoretical yield.

*Control experiment.*—When the polymerization was carried out in the same manner, however, without the addition of lithium chloride, the batch already gelatinized upon the addition of 4 to 5 grams of 4-methyl-azetidinone so that mixing and stirring were no longer possible. The yield amounted to 70% of the theoretical yield; the relative viscosity of the polymer was 5.3.

EXAMPLE 5

0.2 gram of pyrrolidone-potassium was added to a solution of 10 grams of 4-methyl-4-n-propyl-azetidinone, 10 grams of 4,4-dimethyl-azetidinone, 1 gram of lithium chloride and 80 grams of phosphoric acid trisdimethyl amide. The highly viscous solution obtained could be spun in water to yield sheets and filaments. The relative viscosity of the reaction product amounted to 4.5, measured on 1 gram of the substance in 100 ml. of concentrated sulfuric acid at 20° C. The yield amounted to 93%.

EXAMPLE 6

The polymerization was carried out as described in Example 5 except that dimethyl sulfoxide was used as the solvent instead of phosphoric acid trisdimethyl amide. From the highly viscous stable solution formed a polymer was obtained in theoretical yield which had the relative viscosity of 5.1.

The filtered spinning solution which had a temperature of 60° C. had a viscosity of 280 falling ball seconds (steel balls having a diameter of 2.5 mm.) over a distance of 20 cm. This solution was spun through a spinneret of gold and platinum having 20 openings (diameter of the openings: 100 microns) into a coagulation bath containing water having a temperature of 30° C. The filament was drawn off from the bath by means of trio-rollers at a rate of 6 m./min. and drawn in a washing bath of 80° C. by 4.8 times its original length.

EXAMPLE 7

0.2 gram of pyrrolidone-potassium was added to a solution consisting of 10 grams of 4-phenyl-azetidinone, 10 grams of a β-lactam having the structure

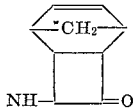

10 grams of lithium chloride and 0.1 gram of azo-iso-butyronitrile in 90 ml. of dimethyl formamide. The temperature was maintained at 20° C. to 30° C. by cooling. A high viscous, stable spinning solution was obtained of which sheets were spread on glass plates, which were placed in dimethyl formamide and then in water. The film could be drawn with or without heating. The sheet became insoluble not only upon being drawn with heating at 150° to 200° C. but also when re-heating the sheet which had been drawn in the cold state.

EXAMPLE 8

0.3 gram of pyrrolidone-potassium was added to a solution of 15 grams of 4-n-butyl-azetidinone, 15 grams of cis-3,4-dimethyl-azetidinone and 10 grams of lithium chloride in 60 ml. of pyrrolidone. While the batch warmed up to 50° C., a highly viscous solution was obtained within a few minutes, from which solution the polymer could be worked up into sheets and filaments; upon being stirred into water, the polymer precipitated.

EXAMPLE 9

0.2 gram potassium acetylide was added to a solution consisting of 10 grams of 4-methyl-4-n-propyl-azetidinone and 2 grams of lithium bromide in 50 ml. of dimethyl acetamide. The mixture was heated during the course of 15 minutes to 80° C. A filament-drawing polymer solution was obtained.

EXAMPLE 10

20 grams of 4-vinyl-azetidinone were polymerized in a solution consisting of 20 grams of lithium bromide and 60 ml. of dimethyl formamide by the addition of 0.2 gram of pyrrolidone-potassium. A filament-drawing solution was obtained.

EXAMPLE 11

0.4 gram of pyrrolidone-potassium was added to a solution consisting of 10 grams of trans-3,4-dimethyl-azetidinone and 10 grams of lithium iodide in a mixture of 50 ml. of dimethyl formamide and 50 ml. diethyl formamide. A highly viscous, spinning polymer solution was obtained.

EXAMPLE 12

0.3 gram of pyrrolidone-potassium was added to a solution of 20 grams of 4-methyl-azetidinone and 15 grams of lithium chloride in 100 ml. of glycol carbonate. Upon being cooled, the lactam polymerized at 20° to 50° C. to yield a highly viscous, spinning solution.

EXAMPLE 13

0.25 gram of pyrrolidone-potassium was added to a solution of 1.0 gram of azetidinon, 1.5 gram of 4-methyl-4-n-propyl-aztidinone, 2.5 grams of lithium chloride in 25 ml. of dimethyl-formamide. During the course of 3 to 5 minutes, the temperature of the reaction mixture rose to 45° C. and a highly viscous spinning solution was obtained.

EXAMPLE 14

0.2 gram of pyrrolidone-potassium was added to a solution consisting of 1.0 gram of azetidinone, 1.0 gram of 4-methyl-4-n-propyl-azetidinone and 0.7 gram of lithium chloride in 6.3 ml. of dimethyl formamide. During the course of 2 minutes the temperature rose to 50° C. in spite of cooling the reaction mixture. A highly viscous spinning solution was obtained.

EXAMPLE 15

0.2 gram of pyrrolidone-potassium was added to a solution consisting of 10 grams of 4,4-dimethyl-azetidinone, 14 grams of lithium chloride, 4 grams of polyacrylonitrile and 126 grams of dimethyl-formamide. After the polymerization of the lactam was complete, the viscous solution was spun through a spinneret of gold and platinum having 60 openings (diameter of the opening: 70 microns) into aqueous dimethyl formamide of 70% strength at 70° C. The filament was drawn and dried.

EXAMPLE 16

0.2 gram of pyrrolidone-potassium was added to a solution of 10 grams of 4-methyl-azetidinone, 10 grams of 4-phenyl-azetidinone and 10 grams of lithium chloride in 100 ml. of methyl pyrrolidone. In spite of cooling, the batch warmed up to 42° C. A stable, viscous solution was obtained which could be worked up into films and filaments. By pouring the solution into water in the mixer, the polyamide was obtained in a yield which corresponded to the theoretical yield.

We claim:
1. A process for the manufacture of spinnable solutions of poly-β-amides by direct polymerization, which comprises polymerizing β-lactams which are unsubstituted at the nitrogen atom in at least one neutral or at most weakly basic solvent in the presence of catalysts and activators usually employed in the anionic polymerization of β-lactams, said solvent containing 0.9% to 50% by weight of at least one lithium halide or lithium pseudo halide selected from the group consisting of lithium fluoride, lithium chloride, lithium bromide, lithium iodide, lithium cyanide, lithium thiocyanate, lithium azide and lithium cyanate, and the molecules of which solvent contain 1 to 12 carbon atoms, at least two hetero atoms of Group V or Group VI of the Periodic Table in direct linkage with one another or linked through a carbon atom, and which contain a semi-polar or a double bond at at least one of these hetero atoms.

2. A process for the manufacture of spinnable solutions of poly-β-amides by direct polymerization, which comprises polymerizing β-lactams which are unsubstituted at the nitrogen atom in at least one neutral or at most weakly basic solvent in the presence of catalysts usually employed in the anionic polymerization of β-lactams, said solvent containing 0.9% to 50% by weight of at least one lithium halide or lithium pseudo halide selected from the group consisting of lithium fluoride, lithium chloride, lithium bromide, lithium iodide, lithium cyanide, lithium thiocyanate, lithium azide and lithium cyanate, and the molecules of which solvent contain 1 to 12 carbon atoms, at least two hetero atoms of Group V or Group VI of the Periodic Table in direct linkage with one another or linked through a carbon atom, and which contain a semi-polar or a double bond at at least one of these hetero atoms.

3. The process as claimed in claim 1, wherein as β-lactams unsubstituted at the nitrogen atom there are used β-lactams carrying one or two hydrogen atoms in β-position to the carbonyl group.

4. The process as claimed in claim 1, wherein as neutral or at most weakly basic solvents, the molecules of which contain 1 to 12 carbon atoms, at least two hetero atoms of Group V or VI of the Periodic Table in direct linkage with one another or linked through a carbon atom and which contain a semi-polar or a double bond at at least one of these hetero atoms, there are used solvents the hetero atoms of which do not contain hydrogen atoms in direct linkage.

5. The process as claimed in claim 1, wherein as neutral or at most weakly basic solvents there are used dimethylformamide, dimethyl acetamide or methyl pyrrolidone.

6. The process as claimed in claim 1, wherein the lithium halide used is lithium chloride.

References Cited

UNITED STATES PATENTS

| | | | |
|---|---|---|---|
| 3,093,618 | 6/1963 | Graf et al. | 260—78 |
| 3,211,706 | 10/1965 | Borner et al. | 260—78 |
| 3,417,163 | 12/1968 | Beermann et al. | 260—857 |

MORRIS LIEBMAN, Primary Examiner

R. ZAITLEN, Assistant Examiner

U.S. Cl. X.R.

260—30.8, 32.6, 78